(12) United States Patent
Taki et al.

(10) Patent No.: US 9,023,536 B2
(45) Date of Patent: May 5, 2015

(54) NON-AQUEOUS ELECTROLYTE SECONDARY BATTERY

(75) Inventors: Takayuki Taki, Tokyo (JP); Yuyu Ohnuma, Tokyo (JP); Atsuki Shibuya, Tokyo (JP); Hiroaki Watanabe, Tokyo (JP); Hisashi Umemoto, Aichi (JP); Kyohei Usami, Aichi (JP); Manabu Yamada, Aichi (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/823,055

(22) PCT Filed: Oct. 13, 2011

(86) PCT No.: PCT/JP2011/073544
§ 371 (c)(1),
(2), (4) Date: Mar. 13, 2013

(87) PCT Pub. No.: WO2012/066878
PCT Pub. Date: May 24, 2012

(65) Prior Publication Data
US 2013/0177822 A1    Jul. 11, 2013

(30) Foreign Application Priority Data

Nov. 16, 2010  (JP) .................................. 2010-256226

(51) Int. Cl.
*H01M 6/16*   (2006.01)
*H01M 10/056*  (2010.01)
(Continued)

(52) U.S. Cl.
CPC ............ *H01M 10/056* (2013.01); *H01M 4/525* (2013.01); *H01M 10/0525* (2013.01);
(Continued)

(58) Field of Classification Search
None
See application file for complete search history.

(56) References Cited

U.S. PATENT DOCUMENTS 5,626,981 A    5/1997 Simon et al.
2003/0113635 A1    6/2003 Gan et al.
(Continued)

FOREIGN PATENT DOCUMENTS

CN    101292389    10/2008
JP    63-102173    5/1988
(Continued)

OTHER PUBLICATIONS

JP2011082001 (Yamada et al., English abstract).*
(Continued)

*Primary Examiner* — Patrick Ryan
*Assistant Examiner* — Jose Colucci Rios
(74) *Attorney, Agent, or Firm* — Young & Thompson

(57) ABSTRACT

Disclosed is a non-aqueous electrolyte secondary battery using a polyanion compound or a lithium nickelate as a positive electrode active material, suppressing the elution of a transition metal from the polyanion compound or ameliorating the deterioration of a binder by a residual alkali component, and provides a non-aqueous electrolyte secondary battery having a negative electrode intercalating and deintercalating lithium ions, a positive electrode containing a lithium-containing compound as a positive electrode active material, and a non-aqueous electrolyte with a lithium salt dissolved in organic solvent. The lithium-containing compound is a polyanion compound or a lithium nickelate. The non-aqueous electrolyte contains a fluorosilane compound:

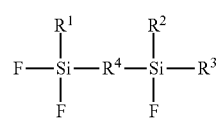

(1)

$R^1$ to $R^3$: alkyl group having 1-8 carbon(s), an alkenyl group having 2-8 carbons, a cycloalkyl group having 5-8 carbons, an aryl group having 6-8 carbons or a fluorine atom. $R^4$: alkylene group having 1-8 carbon(s) or an alkylene group having 4-8 carbons having an ether group.

8 Claims, 1 Drawing Sheet

(51) Int. Cl.
  *H01M 4/525* (2010.01)
  *H01M 10/0525* (2010.01)
  *H01M 10/0567* (2010.01)
  *H01M 4/58* (2010.01)

(52) U.S. Cl.
  CPC .......... *H01M10/0567* (2013.01); *Y02E 60/122* (2013.01); *H01M 4/5825* (2013.01); *Y02T 10/7011* (2013.01)

(56) References Cited

U.S. PATENT DOCUMENTS

| | | | |
|---|---|---|---|
| 2004/0007688 A1 | 1/2004 | Awano et al. | |
| 2006/0269843 A1* | 11/2006 | Usami et al. | 429/324 |
| 2007/0243470 A1 | 10/2007 | Yamamoto et al. | |
| 2009/0197167 A1* | 8/2009 | Olschimke | 429/188 |
| 2010/0015514 A1* | 1/2010 | Miyagi et al. | 429/129 |

FOREIGN PATENT DOCUMENTS

| | | |
|---|---|---|
| JP | 04-87156 | 3/1992 |
| JP | 05-74486 | 3/1993 |
| JP | 10-50342 | 2/1998 |
| JP | 2001-006729 | 1/2001 |
| JP | 2002-134169 | 5/2002 |
| JP | 2002-198092 | 7/2002 |
| JP | 2004-87459 | 3/2004 |
| JP | 2004-171981 | 6/2004 |
| JP | 2009-512148 | 3/2009 |
| JP | 2010-009940 | 1/2010 |
| JP | 2010-238506 | 10/2010 |
| JP | 2011-77029 | 4/2011 |
| JP | 2011-82001 | 4/2011 |
| JP | 2011-082001 | 4/2011 |
| JP | 2011-222450 | 11/2011 |

OTHER PUBLICATIONS

JP2011082001 (Yamada et al., English abstract.*
International Search Report, Dated Jan. 17, 2012, in PCT/JP2011/073544.
M Stanley Whittingham: "Lithium Batteries and Cathode Materials", Chemical Reviews, vol. 104, No. 10, Oct. 1, 2014, pp. 4271-4302, XP055121431, ISSN: 0009-2665, DOI: 10.1021/cr020731c.

* cited by examiner

NON-AQUEOUS ELECTROLYTE SECONDARY BATTERY

TECHNICAL FIELD

The present invention relates to a non-aqueous electrolyte secondary battery, and specifically relates to a non-aqueous electrolyte secondary battery having a positive electrode containing a polyanion compound or a lithium nickelate as a positive electrode active material, and a non-aqueous electrolyte containing a specific fluorosilane compound.

BACKGROUND ART

In accordance with the widespread use of portable electronic devices such as portable personal computers, handy video cameras and information terminals in recent years, non-aqueous electrolyte secondary batteries having a high voltage and a high energy density have been widely used as power sources. Furthermore, in view of environmental problems, battery automobiles and hybrid automobiles utilizing electrical power as a part of the power thereof have been put into practical use.

In non-aqueous electrolyte secondary batteries, various additives for non-aqueous electrolytes have been suggested so as to improve the stability and electric properties of the non-aqueous electrolyte secondary batteries. For example, it is considered that 1,3-propanesultone (for example, see Patent Literature 1), vinyl ethylene carbonate (for example, see Patent Literature 2), vinylene carbonate (for example, see Patent Literature 3), 1,3-propanesultone, butanesultone (for example, see Patent Literature 4), vinylene carbonate (for example, see Patent Literature 5), vinyl ethylene carbonate (for example, see Patent Literature 6) and the like form a stable film called an SEI (Solid Electrolyte Interface) on the surface of a negative electrode, and this film covers the surface of the negative electrode to suppress the reductive decomposition of a non-aqueous electrolyte. Furthermore, it is considered that a disiloxane having an unsaturated group such as a vinyl group (for example, see Patent Literature 7), a fluorosilane to which an alkenyl group is bonded (for example, see Patent Literature 8), an alkylenebisfluorosilane (for example, see Patent Literature 9), a fluorosilane to which an ether group is bonded (for example, see Patent Literature 10) and the like are adsorbed on the surface of a positive electrode to thereby protect the positive electrode and suppress the oxidative decomposition of a non-aqueous electrolyte.

On the other hand, it is known that 1,2-bis(difluoromethylsilyl)ethane can be used as an additive for lithium secondary batteries (for example, see Patent Literature 11), but any test result as a battery has not been disclosed, and any effect on positive electrode active materials has not been known at all.

Conventionally, lithium cobaltate has been widely used as a positive electrode active material in non-aqueous electrolyte secondary batteries, but the cost of cobalt as a raw material has been raising in recent years, and thus positive electrode active materials using inexpensive metal materials other than cobalt have been developed, and use of inexpensive positive electrodes using such positive electrode active materials has been rapidly prevailed. Polyanion compounds such as phosphate salt compounds containing a transition metal such as iron and lithium are excellent in performances in view of the output of a lithium secondary battery, but are inexpensive, whereas they have a problem that the elution of the transition metal such as iron easily occurs at a high temperature, and the capacity of the lithium secondary battery is decreased by repetitive use. Furthermore, lithium nickelates are excellent in performances from the viewpoints of the capacity and output of a lithium secondary battery. However, in general, an alkali component easily remains in a lithium-containing salt of a transition metal oxide containing much nickel, and thus a lithium secondary battery using a lithium nickelate as a positive electrode active material has a problem that the deterioration of a binder that is used in electrodes easily occurs by the residual alkali component and thus the durability of the lithium secondary battery becomes poor. However, the above-mentioned electrolyte additives that have been conventionally known could not exhibit a sufficiently advantageous effect on positive electrodes containing a polyanion compound and a lithium nickelate as positive electrode active materials, and thus further improvement has been demanded.

CITATION LIST

Patent Literature

Patent Literature 1: JP 63-102173 A
Patent Literature 2: JP 04-87156 A
Patent Literature 3: JP 05-74486 A
Patent Literature 4: JP 10-50342 A
Patent Literature 5: U.S. Pat. No. 5,626,981
Patent Literature 6: JP 2001-6729 A
Patent Literature 7: JP 2002-134169 A
Patent Literature 8: US 2004/0007688 A
Patent Literature 9: US 2006/0269843 A
Patent Literature 10: US 2007/0243470 A
Patent Literature 11: US 2009/0197167 A

SUMMARY OF INVENTION

Technical Problem

Therefore, the present invention aims at providing a non-aqueous electrolyte secondary battery using a polyanion compound as a positive electrode active material, which can maintain a small internal resistance and a high electric capacity even after undergoing storage at a high temperature or charging and discharging at a high temperature, by suppressing the elution of a transition metal such as iron from the polyanion compound specifically at a high temperature. Furthermore, the present invention also aims at providing a non-aqueous electrolyte secondary battery using a lithium nickelate as a positive electrode active material, which can maintain a small internal resistance and a high electric capacity even after undergoing storage at a high temperature or charging and discharging at a high temperature, by ameliorating the deterioration of a binder by a residual alkali component.

Solution to Problem

The present inventors have done intensive studies, and consequently found that the above-mentioned aim is attained by using a non-aqueous electrolyte containing a fluorosilane compound having a specific structure, and completed the present invention.

Therefore, the present invention provides a non-aqueous electrolyte secondary battery having a negative electrode that is capable of intercalating and deintercalating lithium ions, a positive electrode containing a lithium-containing compound as a positive electrode active material, and a non-aqueous electrolyte in which a lithium salt is dissolved in an organic solvent, wherein the lithium-containing compound is a polyanion compound or a lithium nickelate, and the non-aqueous electrolyte contains a fluorosilane compound represented by the following general formula (1):

[Chemical Formula 1]

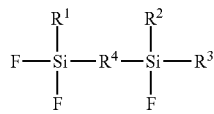
(1)

wherein $R^1$ to $R^3$ each independently represent an alkyl group having 1 to 8 carbon(s), an alkenyl group having 2 to 8 carbons, a cycloalkyl group having 5 to 8 carbons, an aryl group having 6 to 8 carbons or a fluorine atom, and $R^4$ represents an alkylene group having 1 to 8 carbon(s) or an alkylene group having 4 to 8 carbons having an ether group.

Advantageous Effects of Invention

According to the present invention, it became possible to maintain a small internal resistance and a high electric capacity even after undergoing storage at a high temperature or charging and discharging at a high temperature in a non-aqueous electrolyte secondary battery using a polyanion compound or a lithium nickelate as a positive electrode active material.

DESCRIPTION OF EMBODIMENTS

Figure 1:
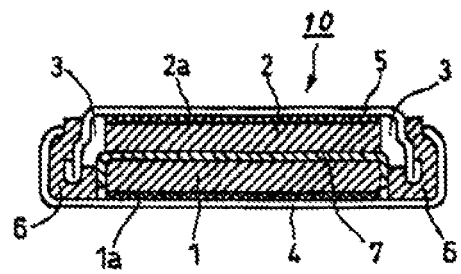
FIG. 1 is a longitudinal cross-sectional drawing schematically showing an example of the structure of the coin-shaped battery of the non-aqueous electrolyte secondary battery of the present invention.

Hereinafter the present invention will be explained in detail based on preferable exemplary embodiments.

The present invention is characterized in that a non-aqueous electrolyte containing a fluorosilane compound represented by the above-mentioned general formula (1) is used in a non-aqueous electrolyte secondary battery using a polyanion compound or a lithium nickelate as a positive electrode active material.

First, the positive electrode used in the present invention will be explained.

The positive electrode active material of the positive electrode used in the present invention is a polyanion compound or lithium nickelate, which is a lithium-containing compound.

As the above-mentioned polyanion compound, a compound represented by the general formula $Li_aM_bXO_c$ (a=0.02 to 2.2, b=0.5 to 2, c=1.4 to 4) can be exemplified. In the above-mentioned general formula, it is preferable that M is a transition element and is at least one kind selected from the group consisting of Co, Mn, Ni and Fe. In the above-mentioned general formula, X is at least one kind selected from the group consisting of Si, P and V. Examples of such polyanion compound may include $Li_2MnSiO_4$, $Li_2NiSiO_4$, $Li_2FeSiO_4$, $LiFePO_4$, $LiMnPO_4$, $LiCoPO_4$ and the like. Furthermore, examples of the compound in which a part of M is substituted by other metal atom such as Al, Ti, V, Cr, Mn, Fe, Co, Ni, Cu, Zn, Mg, Ca, Zr and Nb may include $LiFe_{0.25}Mn_{0.25}Co_{0.25}Ni_{0.25}PO_4$, $LiMn_{0.8}Fe_{0.2}PO_4$ and the like.

Examples of the above-mentioned lithium nickelate may include $LiNiO_2$, as well as compounds in which a part of the Ni atom in $LiNiO_2$ is substituted by other metal atom such as Al, Ti, V, Cr, Fe, Co, Li, Ni, Cu, Zn, Mg, Ga, Zr and Nb, such as $LiNi_{0.8}Co_{0.2}O_2$, $LiNi_{0.8}Co_{0.17}Al_{0.03}O_2$ and $LiNi_{0.8}Co_{0.15}Al_{0.05}O_2$.

Among the above-mentioned polyanion compounds, $LiFePO_4$ and $LiMn_{0.8}Fe_{0.2}PO_4$ are preferable for the reasons that they are excellent in performance as a positive electrode active material, and that the fluorosilane compound represented by the above-mentioned general formula (1) is easily adsorbed and thus a protective layer on the surface of the positive electrode, which prevents the elution of iron, is easily formed.

Among the above-mentioned lithium nickelates, $LiNi_{0.8}Co_{0.2}O_2$, $LiNi_{0.8}Co_{0.17}Al_{0.03}O_2$ and $LiNi_{0.85}Co_{0.1}Al_{0.05}O_2$ are preferable, since they are excellent in performance as a positive electrode active material and the effect of the alkali component by the fluorosilane compound represented by the above-mentioned general formula (1) is considerably decreased.

As the positive electrode used in the present invention, a positive electrode obtained by forming positive electrode materials including the above-mentioned positive electrode active material, a binder, an electroconductive material and the like into a slurry with a solvent, applying the slurry to a current collector, drying, and rolling as necessary to give a sheet-like form.

Examples of the binder for the positive electrode active material may include, but are not limited to, polyvinylidene fluoride, polytetrafluoroethylene, EPDM, SBR, NBR, fluorine rubber, polyacrylic acid and the like. The use amount of the above-mentioned binder is preferably 0.1 to 20 parts by mass, and more preferably 0.5 to 10 parts by mass, with respect to 100 parts by mass of the above-mentioned positive electrode active material.

The electroconductive material used for the positive electrode includes, but is not limited to, microparticles of graphite, carbon blacks such as acetylene black and Ketjen black, microparticles of amorphous carbons such as needle coke, carbon nanofibers and the like. The use amount of the above-mentioned electroconductive material is preferably 0.01 to 20 parts by mass, and more preferably 0.1 to 10 parts by mass, with respect to 100 parts by mass of the above-mentioned positive electrode active material.

As the solvent for forming a slurry, an organic solvent or water that dissolves the above-mentioned binder is used. Examples of the organic solvent may include, but are not limited to, N-methylpyrrolidone, dimethylformamide, dimethylacetamide, methyl ethyl ketone, cyclohexanone, methyl acetate, methyl acrylate, diethyltriamine, N—N-dimethylaminopropylamine, polyethylene oxide, tetrahydrofuran and the like. The use amount of the above-mentioned solvent is preferably 30 to 300 parts by mass, and more preferably 50 to 200 parts by mass, with respect to 100 parts by mass of the above-mentioned positive electrode active material.

As the current collector for the positive electrode, aluminum, stainless steel, nickel-plated steel and the like are generally used.

Subsequently, the non-aqueous electrolyte used in the present invention will be explained. The non-aqueous electrolyte used in the present invention contains a fluorosilane compound represented by the above-mentioned general formula (1) in a non-aqueous electrolyte in which a lithium salt is dissolved in an organic solvent.

In the above-mentioned general formula (1), $R^1$ to $R^3$ each independently represent an alkyl group having 1 to 8 carbon(s), an alkenyl group having 2 to 8 carbons, a cycloalkyl group having 5 to 8 carbons, an aryl group having 6 to 8 carbons or a fluorine atom. Examples of the alkyl group having 1 to 8 carbon(s) may include methyl, ethyl, propyl, isopropyl, butyl, isobutyl, sec-butyl, t-butyl, pentyl, isopentyl, sec-pentyl, t-pentyl, hexyl, sec-hexyl, heptyl, sec-heptyl, octyl, sec-octyl, 2-methylpentyl, 2-ethylhexyl and the like. Examples of the alkenyl group having 2 to 8 carbons may include vinyl, allyl, 3-butenyl, isobutenyl, 4-pentenyl, 5-hexenyl, 6-heptenyl, 7-octenyl and the like. Examples of the cycloalkyl group having 5 to 8 carbons may include cyclopentyl, cyclohexyl, cyclohexylmethyl and the like. Examples of the aryl group having 6 to 8 carbons may include phenyl, tolyl, xylyl and the like. As $R^1$ to $R^3$, a fluorine atom, methyl and ethyl are preferable, and a fluorine atom and methyl are more preferable, since an adverse effect on the transfer of lithium ions is little and the charging property is fine.

$R^4$ represents an alkylene group having 1 to 8 carbon(s) or an alkylene group having 4 to 8 carbons having an ether group. Examples of the alkylene group having 1 to 8 carbon(s) may include methylene, ethylene, propylene, butylene, pentamethylene, hexamethylene, heptamethylene, octamethylene, 2-methylbutylene and the like, and examples of the alkylene group having 4 to 8 carbons having an ether group may include 4-oxaheptylene, 5-oxanonylene and the like. As $R^4$, ethylene, propylene, butylene, 2-methylbutylene and 4-oxaheptylene are preferable, ethylene and 4-oxaheptylene are more preferable, and ethylene is even more preferable, since an adverse effect on the transfer of lithium ions is little and the charging property is fine.

Examples of the fluorosilane compound represented by the above-mentioned general formula (1) may include 1,2-bis(difluorosilyl)methane, 1,1-bis(trifluorosilyl)ethane, 1,2-bis(trifluorosilyl)ethane, 1,2-bis(difluoromethylsilyl)ethane, 1-trifluorosilyl-2-difluoromethylsilylethane, 1-fluorodimethylsilyl-2-difluoromethylsilylethane, 1,2-bis(difluoroethylsilyl)ethane, 1-trifluorosilyl-2-difluoroethylsilylethane, 1-fluorodiethylsilyl-2-difluoroethylsilylethane, 1,2-bis(difluoropropylsilyl)ethane, 1-trifluorosilyl-2-difluoropropylsilylethane, 1-fluorodipropylsilyl-2-difluoropropylsilylethane, 1,2-bis(difluorobutylsilyl)ethane, 1-trifluorosilyl-2-difluorobutylsilylethane, 1-fluorodibutylsilyl-2-difluorobutylsilylethane, 1,2-bis(difluoropentylsilyl)ethane, 1-trifluorosilyl-2-difluoropentylsilylethane, 1-fluorodipentylsilyl-2-difluoropentylsilylethane, 1,2-bis(difluorohexylsilyl)ethane, 1-trifluorosilyl-2-difluorohexylsilylethane, 1-fluorodihexylsilyl-2-difluorohexylsilylethane, 1,2-bis(difluoroheptylsilyl)ethane, 1-trifluorosilyl-2-difluoroheptylsilylethane, 1-fluorodiheptylsilyl-2-difluoroheptylsilylethane, 1,2-bis(difluorooctylsilyl)ethane, 1-trifluorosilyl-2-difluorooctylsilylethane, 1-fluorodioctylsilyl-2-difluorooctylsilylethane, 1,4-bis(trifluorosilyl)butane, 1,4-bis(difluoromethylsilyl)butane, 1-trifluorosilyl-4-difluoromethylsilylbutane, 1-fluorodimethylsilyl-4-difluoromethylsilylbutane, 1,4-bis(difluoroethylsilyl)butane, 1-trifluorosilyl-4-difluoroethylsilylbutane, 1-fluorodiethylsilyl-4-difluoroethylsilylbutane, 1,4-bis(difluoropropylsilyl)butane, 1-trifluorosilyl-4-difluoropropylsilylbutane, 1-fluorodipropylsilyl-4-difluoropropylsilylbutane, 1,4-bis(difluorobutylsilyl)butane, 1-trifluorosilyl-4-difluorobutylsilylbutane, 1-fluorodibutylsilyl-4-difluorobutylsilylbutane, 1,4-bis(difluoropentylsilyl)butane, 1-trifluorosilyl-4-difluoropentylsilylbutane, 1-fluorodipentylsilyl-4-difluoropentylsilylbutane, 1,4-bis(difluorohexylsilyl)butane, 1-trifluorosilyl-4-difluorohexylsilylbutane, 1-fluorodihexylsilyl-4-difluorohexylsilylbutane, 1,4-bis(difluoroheptylsilyl)butane, 1-trifluorosilyl-4-difluoroheptylsilylbutane, 1-fluorodiheptylsilyl-4-difluoroheptylsilylbutane, 1,4-bis(difluorooctylsilyl)butane, 1-trifluorosilyl-4-difluorooctylsilylbutane, 1-fluorodioctylsilyl-4-difluorooctylsilylbutane, 1,4-bis(trifluorosilyl)-2-methylbutane, 1,4-bis(difluoromethylsilyl)-2-methylbutane, 1-trifluorosilyl-4-difluoromethylsilylbutane, 1-fluorodimethylsilyl-4-difluoromethylsilyl-2-methylbutane, 1,4-bis(difluoroethylsilyl)-2-methylbutane, 1-trifluorosilyl-4-difluoroethylsilyl-2-methylbutane, 1-fluorodiethylsilyl-4-difluoroethylsilyl-2-methylbutane, 1,4-bis(difluoropropylsilyl)-2-methylbutane, 1-trifluorosilyl-4-difluoropropylsilyl-2-methylbutane, 1-fluorodipropylsilyl-4-difluoropropylsilyl-2-methylbutane, 1,4-bis(difluorobutylsilyl)-2-methylbutane, 1-trifluorosilyl-4-difluorobutylsilyl-2-methylbutane, 1-fluorodibutylsilyl-4-difluorobutylsilylbutane, 1,4-bis(difluoropentylsilyl)-2-methylbutane, 1-trifluorosilyl-4-difluoropentylsilyl-2-methylbutane, 1-fluorodipentylsilyl-4-difluoropentylsilyl-2-methylbutane, 1,4-bis(difluorohexylsilyl)-2-methylbutane, 1-trifluorosilyl-4-difluorohexylsilyl-2-methylbutane, 1-fluorodihexylsilyl-4-difluorohexylsilyl-2-methylbutane, 1,4-bis(difluoroheptylsilyl)-2-methylbutane, 1-trifluorosilyl-4-difluoroheptylsilyl-2-methylbutane, 1-fluorodiheptylsilyl-4-difluoroheptylsilyl-2-methylbutane, 1,4-bis(difluorooctylsilyl)-2-methylbutane, 1-trifluorosilyl-4-difluorooctylsilyl-2-methylbutane, 1-fluorodioctylsilyl-4-difluorooctylsilyl-2-methylbutane, 1,6-bis(trifluorosilyl)hexane, 1,6-bis(difluoromethylsilyl)hexane, 1-trifluorosilyl-6-difluoromethylsilylhexane, 1-fluorodimethylsilyl-6-difluoromethylsilylhexane, 1,6-bis(difluoroethylsilyl)hexane, 1-trifluorosilyl-6-difluoroethylsilylhexane, 1-fluorodiethylsilyl-6-difluoroethylsilylhexane, 1,6-bis(difluoropropylsilyl)hexane, 1-trifluorosilyl-6-difluoropropylsilylhexane, 1-fluorodipropylsilyl-6-difluoropropylsilylhexane, 1,6-bis(difluorobutylsilyl)hexane, 1-trifluorosilyl-6-difluorobutylsilylhexane, 1-fluorodibutylsilyl-6-difluorobutylsilylhexane, 1,6-bis(difluoropentylsilyl)hexane, 1-trifluorosilyl-6-difluoropentylsilylhexane, 1-fluorodipentylsilyl-6-difluoropentylsilylhexane, 1,6-bis(difluorohexylsilyl)hexane, 1-trifluorosilyl-6-difluorohexylsilylhexane, 1-fluorodihexylsilyl-6-difluorohexylsilylhexane, 1,6-bis(difluoroheptylsilyl)hexane, 1-trifluorosilyl-6-difluoroheptylsilylhexane, 1-fluorodiheptylsilyl-6-difluoroheptylsilylhexane, 1,6-bis(difluorooctylsilyl)hexane, 1-trifluorosilyl-6-difluorooctylsilylhexane, 1-fluorodioctylsilyl-6-difluorooctylsilylhexane, 1-fluorodimethylsilyl-2-difluoroethylsilylethane and the like.

Among these, bis(difluoromethylsilyl)methane, 1,1-bis(difluoromethylsilyl)ethane, 1,2-bis(difluoromethylsilyl)ethane, 1-fluorodimethylsilyl-2-difluoromethylsilylethane, 1-trifluorosilyl-2-difluoromethylsilylethane, 1,4-bis(difluoromethylsilyl)butane, 1,4-bis(difluoromethylsilyl)-2-methylbutane and 1,7-bis(difluoromethylsilyl)-4-oxaheptane are preferable, 1,2-bis(difluoromethylsilyl)ethane, 1,4-bis(difluoromethylsilyl)butane, 1,4-bis(difluoromethylsilyl)-2-methylbutane and 1,7-bis(difluoromethylsilyl)-4-oxaheptane are more preferable, and 1,2-bis(difluoromethylsilyl)ethane and 1,4-bis(difluoromethylsilyl)-2-methylbutane are even more preferable.

In the non-aqueous electrolyte according to the present invention, in the case when the content of the fluorosilane compound represented by the above-mentioned general formula (1) is too small, a sufficient effect cannot be exerted, whereas in the case when the content of the compound is too much, an amount-increasing effect that reflects the content cannot be obtained, and the properties of the non-aqueous electrolyte may be rather adversely affected; therefore, the content of the fluorosilane compound represented by the above-mentioned general formula (1) is preferably 0.001 to 5 mass %, more preferably 0.01 to 4 mass %, and even more preferably 0.03 to 3 mass % in the non-aqueous electrolyte.

It is preferable that the non-aqueous electrolyte according to the present invention further contains an unsaturated phosphate ester compound represented by the following general formula (2) or an unsaturated phosphate ester compound represented by the following general formula (3) since the reduction reaction of the non-aqueous electrolyte on the negative electrode can be suppressed:

[Chemical Formula 2]

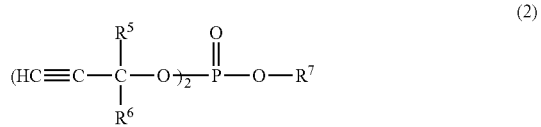

(2)

wherein $R^5$ and $R^6$ each independently represent a hydrogen atom or an alkyl group having 1 to 8 carbon(s), and $R^7$ represents an alkyl group having 1 to 8 carbon(s), an alkenyl group having 2 to 8 carbons, an alkynyl group having 2 to 8 carbons or a halogenated alkyl group having 1 to 8 carbon(s);

[Chemical Formula 3]

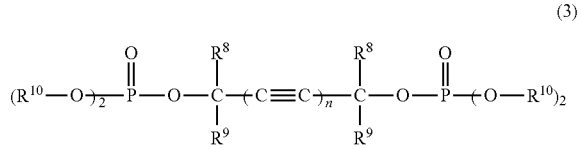

(3)

wherein $R^8$ and $R^9$ each independently represent a hydrogen atom or an alkyl group having 1 to 8 carbon(s), $R^{10}$ represents an alkyl group having 1 to 8 carbon(s), an alkenyl group having 2 to 8 carbons, an alkynyl group having 2 to 8 carbons or a halogenated alkyl group having 1 to 8 carbon(s), and n represents 1 or 2.

First, the unsaturated phosphate ester compound represented by the above-mentioned general formula (2) will be explained. In the above-mentioned general formula (2), $R^5$ and $R^6$ each independently represent a hydrogen atom or an alkyl group having 1 to 8 carbon(s). Examples of the alkyl group having 1 to 8 carbon(s) may include the alkyl groups having 1 to 8 carbon(s) which are exemplified in the explanation on $R^1$ to $R^3$ in the above-mentioned general formula (1). As $R^5$ and $R^6$, a hydrogen atom, methyl, ethyl and propyl are preferable, a hydrogen atom and methyl are more preferable, and a hydrogen atom is even more preferable since an adverse effect on the transfer of lithium ions is little and the charging property is fine.

$R^7$ represents an alkyl group having 1 to 8 carbon(s), an alkenyl group having 2 to 8 carbons, an alkynyl group having 2 to 8 carbons or a halogenated alkyl group having 1 to 8 carbon(s). Examples of the alkyl group having 1 to 8 carbon(s) and alkenyl group having 2 to 8 carbons may include the alkyl groups having 1 to 8 carbon(s) and alkenyl groups having 2 to 8 carbons which are exemplified for $R^1$ to $R^3$ in the above-mentioned general formula (1), and the like. Examples of the alkynyl group having 2 to 8 carbons may include ethynyl, 2-propinyl (also referred to as propargyl), 3-butynyl, 1-methyl-2-propinyl, 1,1-dimethyl-2-propinyl and the like. Examples of the halogenated alkyl group having 1 to 8 carbon(s) may include chloromethyl, trifluoromethyl, 2-fluoroethyl, 2-chloroethyl, 2,2,2-trifluoroethyl, 2,2,2-trichloroethyl, 1,1,2,2-tetrafluoroethyl, pentafluoroethyl, 3-fluoropropyl, 2-chloropropyl, 3-chloropropyl, 2-chloro-2-propyl, 3,3,3-trifluoropropyl, 2,2,3,3-tetrafluoropropyl, heptafluoropropyl, 2-chlorobutyl, 3-chlorobutyl, 4-chlorobutyl, 3-chloro-2-butyl, 1-chloro-2-butyl, 2-chloro-1,1-dimethylethyl, 3-chloro-2-methylpropyl, 5-chloropentyl, 3-chloro-2-methylpropyl, 3-chloro-2,2-dimethyl, 6-chlorohexyl and the like.

As $R^7$, methyl, ethyl, propyl, isopropyl, butyl, pentyl, 2-propinyl, 3-chloropropyl, 3-chlorobutyl and 4-chlorobutyl are preferable, methyl, ethyl, propyl and 2-propinyl are more preferable, and ethyl and 2-propinyl are even more preferable since the internal resistance of the non-aqueous electrolyte secondary battery is decreased.

Among the unsaturated phosphate ester compounds represented by the above-mentioned general formula (2), examples of the compounds wherein $R^5$ and $R^6$ are hydrogen atoms may include methyl bis(2-propinyl) phosphate, ethyl bis(2-propinyl) phosphate, propyl bis(2-propinyl) phosphate, butyl bis(2-propinyl) phosphate, pentyl bis(2-propinyl) phosphate, allyl bis(2-propinyl) phosphate, tris(2-propinyl) phosphate, 2-chloroethyl bis(2-propinyl) phosphate, 2,2,2-trifluoroethyl bis(2-propinyl) phosphate, 2,2,2-trichloroethyl bis(2-propinyl) phosphate and the like.

Among the unsaturated phosphate ester compounds represented by the above-mentioned general formula (2), examples of the compounds wherein $R^5$ is methyl and $R^6$ is a hydrogen atom may include methyl bis(1-methyl-2-propinyl) phosphate, ethyl bis(1-methyl-2-propinyl) phosphate, propyl bis(1-methyl-2-propinyl) phosphate, butyl bis(1-methyl-2-propinyl) phosphate, pentyl bis(1-methyl-2-propinyl) phosphate, allyl bis(1-methyl-2-propinyl) phosphate, 2-propinyl bis(1-methyl-2-propinyl) phosphate, tris(1-methyl-1-methyl-2-propinyl) phosphate, 2-chloroethyl bis(1-methyl-2-propinyl) phosphate, 2,2,2-trifluoroethyl bis(1-methyl-2-propinyl) phosphate, 2,2,2-trichloroethyl bis(1-methyl-2-propinyl)phosphate and the like.

Among the unsaturated phosphate ester compounds represented by the above-mentioned general formula (2), examples of the compounds wherein $R^5$ and $R^6$ are methyl may include methyl bis(1,1-dimethyl-2-propinyl) phosphate, ethyl bis(1,1-dimethyl-2-propinyl) phosphate, propyl bis(1,1-dimethyl-2-propinyl) phosphate, butyl bis(1,1-dimethyl-2-propinyl) phosphate, pentyl bis(1,1-dimethyl-2-propinyl) phosphate, allyl bis(1,1-dimethyl-2-propinyl) phosphate, 2-propinyl bis(1,1-dimethyl-2-propinyl) phosphate, tris(1,1-dimethyl-2-propinyl) phosphate, 2-chloroethyl bis(1,1-dimethyl-2-propinyl) phosphate, 2,2,2-trifluoroethyl bis(1,1-dimethyl-2-propinyl) phosphate, 2,2,2-trichloroethyl bis(1,1-dimethyl-2-propinyl) phosphate and the like.

As the above-mentioned unsaturated phosphate ester compound represented by the above-mentioned general formula (2), methyl bis(2-propinyl) phosphate, ethyl bis(2-propinyl) phosphate, propyl bis(2-propinyl) phosphate, butyl bis(2-propinyl) phosphate, pentyl bis(2-propinyl) phosphate, tris (2-propinyl) phosphate and 2-chloroethyl bis(2-propinyl) phosphate are preferable, ethyl bis(2-propinyl) phosphate, propyl bis(2-propinyl) phosphate, butyl bis(2-propinyl) phosphate and tris(2-propinyl) phosphate are more preferable, and ethyl bis(2-propinyl) phosphate and tris(2-propinyl) phosphate are even more preferable.

Subsequently, the unsaturated phosphate ester compound represented by the above-mentioned general formula (3) will be explained. In the above-mentioned general formula (3), $R^8$ and $R^9$ each independently represent a hydrogen atom or an alkyl group having 1 to 8 carbon(s). Examples of the alkyl group having 1 to 8 carbon(s) may include the alkyl groups having 1 to 8 carbon(s) which are exemplified in the explanation on $R^1$ to $R^3$ in the above-mentioned general formula (1), and the like. As $R^8$ and $R^9$, a hydrogen atom, methyl, ethyl and propyl are preferable, a hydrogen atom and methyl are more preferable, and a hydrogen atom is even more preferable, since an adverse effect on the transfer of lithium ions is little and the charging property is fine.

In the above-mentioned general formula (3), $R^{10}$ represents an alkyl group having 1 to 8 carbon(s), an alkenyl group having 2 to 8 carbons, an alkynyl group having 2 to 8 carbons or a halogenated alkyl group having 1 to 8 carbon(s). Examples of the alkyl group having 1 to 8 carbon(s) and alkenyl group having 2 to 8 carbons may include the alkyl groups having 1 to 8 carbon(s) and alkenyl groups having 2 to 8 carbons which are exemplified in the explanation on $R^1$ to $R^3$ in the above-mentioned general formula (1), and the like. Examples of the alkynyl group having 2 to 8 carbons and halogenated alkyl group having 1 to 8 carbon(s) may include the alkynyl groups having 2 to 8 carbons and halogenated alkyl groups having 1 to 8 carbon(s) which are exemplified in the explanation on $R^7$ in the above-mentioned general formula (1), and the like.

As $R^{10}$, methyl, ethyl, propyl, isopropyl, butyl, pentyl, 2-propinyl, 3-chloropropyl, 3-chlorobutyl and 4-chlorobutyl are preferable, methyl, ethyl, propyl and 2-propinyl are more preferable, and methyl and ethyl are even more preferable, since the internal resistance of the non-aqueous electrolyte secondary battery is decreased.

In the above-mentioned general formula (3), n represents 1 or 2. n is preferably 2 since the phosphate ester reaction from an alkyne diol as a raw material is easy and can be obtained with a high yield.

Among the unsaturated phosphate ester compounds represented by the above-mentioned general formula (3), examples of the compounds wherein n is 1 may include 2-butyne-1,4-diol tetramethyl diphosphate, 2-butyne-1,4-diol tetraethyl diphosphate, 2-butyne-1,4-diol tetrapropyl diphosphate, 2-butyne-1,4-diol tetraisopropyl diphosphate, 2-butyne-1,4-diol tetrabutyl diphosphate, 2-butyne-1,4-diol tetrapentyl diphosphate, 2-butyne-1,4-diol tetrakis(2-propinyl) diphosphate, 2-butyne-1,4-diol tetrakis(3-chloropropyl) diphosphate, 2-butyne-1,4-diol tetrakis(3-chlorobutyl) diphosphate, 2-butyne-1,4-diol tetrakis(4-chlorobutyl) diphosphate and the like, and among these, 2-butyne-1,4-diol tetramethyl diphosphate, 2-butyne-1,4-diol tetraethyl diphosphate, 2-butyne-1,4-diol tetrapropyl diphosphate and 2-butyne-1,4-diol tetrakis(2-propinyl) diphosphate are preferable, and 2-butyne-1,4-diol tetramethyl diphosphate and 2-butyne-1,4-diol tetrakis(2-propinyl) diphosphate are more preferable.

Among the unsaturated phosphate ester compounds represented by the above-mentioned general formula (3), examples of the compounds wherein n is 2 may include 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate, 2,4-hexadiyne-1,6-diol tetraisopropyl diphosphate, 2,4-hexadiyne-1,6-diol tetrabutyl diphosphate, 2,4-hexadiyne-1,6-diol tetrapentyl diphosphate, 2,4-hexadiyne-1,6-diol tetrakis(2-propinyl) diphosphate, 2,4-hexadiyne-1,6-diol tetrakis(3-chloropropyl) diphosphate, 2,4-hexadiyne-1,6-diol tetrakis(3-chlorobutyl) diphosphate, 2,4-hexadiyne-1,6-diol tetrakis(4-chlorobutyl) diphosphate and the like, and among these, 2,4-hexadiyne-1,6-diol tetramethyl diphosphate, 2,4-hexadiyne-1,6-diol tetraethyl diphosphate, 2,4-hexadiyne-1,6-diol tetrapropyl diphosphate and 2,4-hexadiyne-1,6-diol tetrakis(2-propinyl) diphosphate are preferable, and 2,4-hexadiyne-1,6-diol tetramethyl diphosphate and 2,4-hexadiyne-1,6-diol tetrakis(2-propinyl) diphosphate are more preferable.

In the non-aqueous electrolyte according to the present invention, in the case when the total content of the unsaturated phosphate ester compound represented by the above-mentioned general formula (2) and the unsaturated phosphate ester compound represented by the above-mentioned general formula (3) is too small, a sufficient effect cannot be exerted, whereas in the case when the total content is too large, an amount-increasing effect that reflects the content cannot be obtained, and the properties of the non-aqueous electrolyte may be rather adversely affected; therefore, the total content of the unsaturated phosphate ester compound represented by the above-mentioned general formula (2) and the unsaturated phosphate ester compound represented by the above-mentioned general formula (3) is preferably 0.001 to 5 mass %, more preferably 0.01 to 4 mass %, and even more preferably 0.03 to 3 mass % in the non-aqueous electrolyte.

Among the unsaturated phosphate ester compound represented by the above-mentioned general formula (2) and the unsaturated phosphate ester compound represented by the above-mentioned general formula (3), the unsaturated phosphate ester compound represented by the above-mentioned general formula (2) is preferable from the viewpoint that raw materials are easily available in industry. In the case when the unsaturated phosphate ester compound represented by the above-mentioned general formula (2) and the unsaturated phosphate ester compound represented by the above-mentioned general formula (3) are used in combination, the mass ratio of the unsaturated phosphate ester compound represented by the above-mentioned general formula (3) to the unsaturated phosphate ester compound represented by the above-mentioned general formula (2) is preferably 0.05 to 10, more preferably 0.1 to 5, and even more preferably 0.2 to 3.

In order to improve the output property at a low temperature, it is preferable that the non-aqueous electrolyte according to the present invention further contains a fluorosilane compound represented by the following general formula (4).

[Chemical Formula 4]

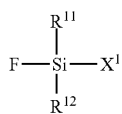

(4)

wherein $R^{11}$ and $R^{12}$ each independently represent an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, $X^1$ represents a fluorine atom, an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons, an aralkyl group having 7 to 18 carbons, a group represented by the following general formula (5) or a group represented by the following general formula (6):

[Chemical Formula 5]

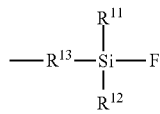

(5)

wherein $R^{11}$ and $R^{12}$ are as defined in the general formula (4), and $R^{13}$ represents an alkylene group having 1 to 8 carbon(s), an alkenylene group having 2 to 8 carbons, an alkynylene group having 2 to 8 carbons or an arylene group having 6 to 18 carbons;

[Chemical Formula 6]

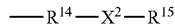

(6)

wherein $R^{14}$ represents an alkylene group having 1 to 8 carbon(s), an alkenylene group having 2 to 8 carbons, an alkynylene group having 2 to 8 carbons or an arylene group having 6 to 18 carbons, $R^{15}$ represents an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, and $X^2$ represents an oxygen atom, a —C(=O)—O— group or an —O—C(=O)— group.

In the above-mentioned general formula (4), $R^{11}$ and $R^{12}$ each independently represent an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons.

Examples of the alkyl group having 1 to 8 carbon(s) and alkenyl group having 2 to 8 carbons may include the alkyl groups having 1 to 8 carbon(s) and alkenyl groups having 2 to 8 carbons which are exemplified in the explanation on $R^1$ to $R^3$ in the above-mentioned general formula (1), and the like. Examples of the alkynyl group having 2 to 8 carbons and halogenated alkyl group having 1 to 8 carbon(s) may include the alkynyl groups having 2 to 8 carbons and halogenated alkyl groups having 1 to 8 carbon(s) which are exemplified in the explanation on $R^7$ in the above-mentioned general formula (2), and the like.

Examples of the aryl group having 6 to 18 carbons may include phenyl, methylphenyl, dimethylphenyl, ethylphenyl, trimethylphenyl, propylphenyl, isopropylphenyl, butylphenyl, t-butylphenyl, pentylphenyl, t-pentylphenyl, hexylphenyl, heptylphenyl, octylphenyl, nonylphenyl, decylphenyl, undecylphenyl, dodecylphenyl, phenylphenyl, benzylphenyl, styrenated phenyl, 4-(1-methyl-1-phenylethyl)phenyl (also referred to as p-cumylphenyl), dinonylphenyl, α-naphthyl, β-naphthyl and the like. Examples of the halogenated aryl group having 6 to 18 carbons may include 2-fluorophenyl, 3-fluorophenyl, 4-fluorophenyl, 2,4-difluorophenyl, 3,5-difluorophenyl, 2,6-difluorophenyl, 2,3-difluorophenyl, 4,5-difluorophenyl, 2,4,6-trifluorophenyl, 2,3,4-trifluorophenyl, tetrafluorophenyl and the like.

Examples of the aralkyl group having 7 to 18 carbons may include benzyl, 2-phenylethyl, 2-phenyl-2-propyl, 3-phenylpropyl, diphenylmethyl and the like.

As $R^{11}$ and $R^{12}$, methyl, ethyl, propyl, isopropyl, butyl, pentyl, 3-chloropropyl, 3-chlorobutyl and 4-chlorobutyl are preferable, methyl, ethyl and propyl are more preferable, and methyl is even more preferable, since the internal resistance of the non-aqueous electrolyte secondary battery is decreased.

In the above-mentioned general formula (4), $X^1$ represents a fluorine atom, an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, the group represented by the above-mentioned general formula (5), or the group represented by the above-mentioned general formula (6).

Examples of the alkyl group having 1 to 8 carbon(s) and alkenyl group having 2 to 8 carbons may include the alkyl groups having 1 to 8 carbon(s) and alkenyl groups having 2 to 8 carbons which are exemplified in the explanation on $R^1$ to $R^3$ in the above-mentioned general formula (1), and the like. Examples of the alkynyl group having 2 to 8 carbons and halogenated alkyl group having 1 to 8 carbon(s) may include the alkynyl groups having 2 to 8 carbons and halogenated alkyl groups having 1 to 8 carbon(s) which are exemplified in the explanation on $R^7$ in the above-mentioned general formula (2), and the like. Examples of the aryl group having 6 to 18 carbons, halogenated aryl group having 6 to 18 carbons or aralkyl group having 7 to 18 carbons may include the aryl groups having 6 to 18 carbons, halogenated aryl groups having 6 to 18 carbons or aralkyl groups having 7 to 18 carbons which are exemplified in the explanation on $R^{11}$ and $R^{12}$ in the above-mentioned general formula (4), and the like.

In the above-mentioned general formula (5), $R^{11}$ and $R^{12}$ are as defined in the above-mentioned general formula (4), and $R^{13}$ represents an alkylene group having 1 to 8 carbon(s), an alkenylene group having 2 to 8 carbons, an alkynylene group having 2 to 8 carbons or an arylene group having 6 to 18 carbons.

Examples of the alkylene group having 1 to 8 carbon(s) may include the alkylene groups having 1 to 8 carbon(s) which are exemplified for $R^4$ in the above-mentioned general formula (1). Examples of the alkenylene group having 2 to 8 carbons may include 1,2-ethenediyl (also referred to as ethenylene or vinylene), 2-butene-1,4-diyl, 1,2-dimethyl-1,2-ethenediyl and the like. Examples of the alkynylene group having 2 to 8 carbons may include 1,2-ethynediyl (also referred to as ethynylene), 2-butyne-1,4-diyl and the like. Examples of the arylene group having 6 to 18 carbons may include 1,2-phenylene, 1,4-phenylene, (1,1'-biphenyl)-4,4'-diyl and the like.

As $R^{13}$, ethylene, propylene, tetramethylene, pentamethylene, hexamethylene, heptamethylene, octamethylene, 2-methyltetramethylene, 1,2-ethynediyl and 1,2-phenylene are preferable, ethylene, propylene and tetramethylene are more preferable, and ethylene is even more preferable, since the internal resistance of the non-aqueous electrolyte secondary battery is decreased.

In the above-mentioned general formula (6), $R^{14}$ represents an alkylene group having 1 to 8 carbon(s), an alkenylene group having 2 to 8 carbons, an alkynylene group having 2 to 8 carbons or an arylene group having 6 to 18 carbons.

Examples of the alkylene group having 1 to 8 carbon(s) may include the alkylene groups having 1 to 8 carbon(s) which are exemplified in the explanation on $R^4$ in the above-mentioned general formula (1), and the like. Examples of the alkenylene group having 2 to 8 carbons, alkynylene group having 2 to 8 carbons and arylene group having 6 to 18 carbons may include the groups that are exemplified in the explanation on $R^{13}$ in the above-mentioned general formula (5), and the like. As $R^{14}$, ethylene, propylene, tetramethylene, pentamethylene, hexamethylene, heptamethylene, octamethylene, 2-methyltetramethylene, 1,2-ethynediyl and 1,2-phenylene are preferable, ethylene, propylene and tetramethylene are more preferable, and ethylene is even more preferable, since the internal resistance of the non-aqueous electrolyte secondary battery is decreased.

In the above-mentioned general formula (6), $R^{15}$ represents an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, and $X^2$ represents an oxygen atom, a —C(=O)—O-group or an —O—C(=O)-group.

Examples of the alkyl group having 1 to 8 carbon(s) and alkenyl group having 2 to 8 carbons may include the alkyl groups having 1 to 8 carbon(s) and alkenyl groups having 2 to 8 carbons which are exemplified in the explanation on $R^1$ to $R^3$ in the above-mentioned general formula (1), and the like. Examples of the alkynyl group having 2 to 8 carbons and halogenated alkyl group having 1 to 8 carbon(s) may include the alkynyl groups having 2 to 8 carbons and halogenated alkyl groups having 1 to 8 carbon(s) which are exemplified in the explanation on $R^7$ in the above-mentioned general formula (2), and the like. Examples of the aryl group having 6 to 18 carbons, halogenated aryl group having 6 to 18 carbons or aralkyl group having 7 to 18 carbons may include the aryl groups having 6 to 18 carbons, halogenated aryl groups having 6 to 18 carbons or aralkyl groups having 7 to 18 carbons which are exemplified in the explanation on $R^{11}$ and $R^{12}$ in the above-mentioned general formula (4), and the like.

Among the compounds represented by the above-mentioned general formula (4) wherein $X^1$ is a fluorine atom, specific examples of preferable compounds may include butylmethyldifluorosilane, isobutylmethyldifluorosilane, pentylmethyldifluorosilane, hexylmethyldifluorosilane, heptylmethyldifluorosilane, octylmethyldifluorosilane, cyclopentylmethyldifluorosilane, cyclohexylmethyldifluorosilane, cycloheptylmethyldifluorosilane, cyclooctylmethyldifluorosilane, cyclopentylmethyldifluorosilane, cyclohexylmethyldifluorosilane, cycloheptylmethyldifluorosilane, cyclooctylmethyldifluorosilane and the like.

Among the compounds represented by the above-mentioned general formula (4) wherein $X^1$ is an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, specific examples of preferable compounds may include trimethylfluorosilane, ethyldimethylfluorosilane, propyldimethylfluorosilane, isopropyldimethylfluorosilane, butyldimethylfluorosilane, sec-butyldimethylfluorosilane, t-butyldimethylfluorosilane, pentyldimethylfluorosilane, hexyldimethylfluorosilane, heptyldimethylfluorosilane, octyldimethylfluorosilane, 2-ethylhexyldimethylfluorosilane, trifluoromethyldimethylfluorosilane, tetrafluoroethyldimethylfluorosilane, heptafluoropropyldimethylfluorosilane, 2,2,2-trifluoroethyldimethylfluorosilane, vinyldimethylfluorosilane, allyldimethylfluorosilane, 1-propenyldimethylfluorosilane, isopropenyldimethylfluorosilane, 2-butenyldimethylfluorosilane, 1,3-butadienyldimethylfluorosilane, 2-pentenyldimethylfluorosilane, 2-octenyldimethylfluorosilane, ethynyldimethylfluorosilane, 1-propinyldimethylfluorosilane, 2-propinyldimethylfluorosilane, 1-butynyldimethylfluorosilane, 2-butynyldimethylfluorosilane, 3-butynyldimethylfluorosilane, phenyldimethylfluorosilane, 2-fluorophenyldimethylfluorosilane, 3-fluorophenyldimethylfluorosilane, 4-fluorophenyldimethylfluorosilane, 2,4-difluorophenyldimethylfluorosilane, 3,5-difluorophenyldimethylfluorosilane, 2,6-difluorophenyldimethylfluorosilane, 2,3-difluorophenyldimethylfluorosilane, 4,5-difluorophenyldimethylfluorosilane, 2,4,6-trifluorophenyldimethylfluorosilane, 2,3,4-trifluorophenyldimethylfluorosilane, tetrafluorophenyldimethylfluorosilane, 2-methylphenyldimethylfluorosilane, 3-methylphenyldimethylfluorosilane, 4-methylphenyldimethylfluorosilane, 2,4-dimethylphenyldimethylfluorosilane, 3,5-dimethylphenyldimethylfluorosilane and the like.

Furthermore, among the compounds represented by the above-mentioned general formula (4) wherein $X^1$ is the group represented by the above-mentioned general formula (5), specific examples of preferable compounds may include 1,2-di(dimethylfluorosilyl)ethane, 1,2-di(diethylfluorosilyl)ethane, 1,2-di(dipropylfluorosilyl)ethane, 1,2-di(dibutylfluorosilyl)ethane, 1,3-di(dimethylfluorosilyl)propane, 1,2-di(diethylfluorosilyl)propane, 1,3-di(dipropylfluorosilyl)propane, 1,3-di(dibutylfluorosilyl)propane, 1,4-di(dimethylfluorosilyl)butane, 1,4-di(diethylfluorosilyl)butane, 1,4-di(dipropylfluorosilyl)butane, 1,4-di(dibutylfluorosilyl)butane, 1,5-di(dimethylfluorosilyl)pentane, 1,5-di(diethylfluorosilyl)pentane, 1,5-di(dipropylfluorosilyl)pentane, 1,5-di(dibutylfluorosilyl)pentane, 1,6-di(dimethylfluorosilyl)hexane, 1,6-di(diethylfluorosilyl)hexane, 1,6-di(dipropylfluorosilyl)hexane, 1,6-di(dibutylfluorosilyl)hexane, 1,7-di(dimethylfluorosilyl)heptane, 1,7-di(diethylfluorosilyl)heptane, 1,7-di(dipropylfluorosilyl)heptane, 1,7-di(dibutylfluorosilyl)heptane, 1,8-di(dimethylfluorosilyl)octane, 1,8-di(diethylfluorosilyl)octane, 1,8-di(dipropylfluorosilyl)octane, 1,8-di(dibutylfluorosilyl)octane, 1,4-di(dimethylfluorosilyl)-2-methylbutane, 1,4-di(diethylfluorosilyl)-2-methylbutane, 1,4-di(dipropylfluorosilyl)-2-methylbutane, 1,4-di(dibutylfluorosilyl)-2-methylbutane, 1,2-di(dimethylfluorosilyl)acetylene, 1,2-di(diethylfluorosilyl)acetylene, 1,2-di(dipropylfluorosilyl)acetylene, 1,2-di(dibutylfluorosilyl)acetylene, 1,4-di(dimethylfluorosilyl)benzene, 1,3-di(dimethylfluorosilyl)benzene, 1,2-di(dimethylfluorosilyl)benzene and the like.

Furthermore, among the compounds represented by the above-mentioned general formula (4) wherein $X^1$ is the group represented by the above-mentioned general formula (6), and $X^2$ in the same formula is an oxygen atom, specific examples of preferable compounds may include 3-methoxypropyldimethylfluorosilane, 3-ethoxypropyldimethylfluorosilane, 3-propoxypropyldimethylfluorosilane, 3-butoxypropyldimethylfluorosilane, 3-pentoxypropyldimethylfluorosilane, 3-hexoxypropyldimethylfluorosilane, 4-methoxybutyldimethylfluorosilane, 4-ethoxybutyldimethylfluorosilane, 4-propoxybutyldimethylfluorosilane, 4-butoxybutyldimethylfluorosilane, 4-pentoxybutyldimethylfluorosilane, 4-hexoxybutyldimethylfluorosilane and the like.

Furthermore, among the compounds represented by the above-mentioned general formula (4) wherein $X^1$ is the group represented by the above-mentioned general formula (6), and $X^2$ in the same formula is a —C(=O)—O-group, specific examples of preferable compounds may include 2-(dimethylfluorosilyl)ethyl acetate, 3-(dimethylfluorosilyl)propyl acetate, 3-(dimethylfluorosilyl)butyl acetate, 3-(dimethylfluorosilyl)pentyl acetate, 3-(dimethylfluorosilyl)hexyl acetate, 2-(dimethylfluorosilyl)ethyl propionate, 3-(dimethylfluorosilyl)propyl propionate, 3-(dimethylfluorosilyl)butyl propionate, 3-(dimethylfluorosilyl)pentyl propionate, 3-(dimethylfluorosilyl)hexyl propionate, 2-(dimethylfluorosilyl)ethyl butanoate, 3-(dimethylfluorosilyl)propyl butanoate, 4-(dimethylfluorosilyl)butyl butanoate, 5-(dimethylfluorosilyl)pentyl butanoate, 6-(dimethylfluorosilyl) hexyl butanoate and the like.

Furthermore, among the compounds represented by the above-mentioned general formula (4) wherein $X^1$ is the group represented by the above-mentioned general formula (6), and $X^2$ in the same formula is an —O—C(=O)-group, specific examples of preferable compounds may include methyl dimethylfluorosilylacetate, ethyl dimethylfluorosilylacetate, butyl dimethylfluorosilylacetate, pentyl dimethylfluorosilylacetate, hexyl dimethylfluorosilylacetate, methyl 3-(dimethylfluorosilyl)propionate, ethyl 3-(dimethylfluorosilyl)propionate, propyl 3-(dimethylfluorosilyl)propionate, butyl 3-(dimethylfluorosilyl)propionate, pentyl 3-(dimethylfluorosilyl)propionate, hexyl 3-(dimethylfluorosilyl)propionate, methyl 4-(dimethylfluorosilyl)butanoate, ethyl 4-(dimethylfluorosilyl)butanoate, propyl 4-(dimethylfluorosilyl)butanoate, butyl 4-(dimethylfluorosilyl)butanoate, pentyl 4-(dimethylfluorosilyl)butanoate, hexyl 4-(dimethylfluorosilyl)butanoate and the like.

In the non-aqueous electrolyte according to the present invention, in the case when the content of the fluorosilane compound represented by the above-mentioned general formula (4) is too small, a sufficient effect cannot be exerted, whereas in the case when the content is too much, an amount-increasing effect that reflects the content cannot be obtained, and the properties of the non-aqueous electrolyte for batteries may be rather adversely affected; therefore, the content of the fluorosilane compound represented by the above-mentioned general formula (4) is preferably 0.01 to 5 mass %, more preferably 0.03 to 4 mass %, and even more preferably 0.05 to 3 mass % in the non-aqueous electrolyte. The fluorosilane compounds represented by the above-mentioned general formula (4) may be used by only one kind, or two or more kinds may be used in combination.

It is preferable that the non-aqueous electrolyte according to the present invention further contains an additive including a cyclic carbonate compound having an unsaturated group, a chain carbonate compound, an unsaturated diester compound, a halogenated cyclic carbonate compound, a cyclic sulfite ester or a cyclic sulfuric acid ester, and the like.

Examples of the above-mentioned cyclic carbonate compound having an unsaturated group may include vinylene carbonate, vinylethylene carbonate, propylidene carbonate, ethylene ethylidene carbonate, ethylene isopropylidene carbonate and the like, and vinylene carbonate and vinylethylene carbonate are preferable. Examples of the above-mentioned chain carbonate compound may include dipropargyl carbonate, propargyl methyl carbonate, ethyl propargyl carbonate, bis(1-methylpropargyl) carbonate, bis(1-dimethylpropargyl) carbonate and the like. Examples of the above-mentioned unsaturated diester compound may include dimethyl maleate, diethyl maleate, dipropyl maleate, dibutyl maleate, dipentyl maleate, dihexyl maleate, diheptyl maleate, dioctyl maleate, dimethyl fumarate, diethyl fumarate, dipropyl fumarate, dibutyl fumarate, dipentyl fumarate, dihexyl fumarate, diheptyl fumarate, dioctyl fumarate, dimethyl acetylenedicarboxylate, diethyl acetylenedicarboxylate, dipropyl acetylenedicarboxylate, dibutyl acetylenedicarboxylate, dipentyl acetylenedicarboxylate, dihexyl acetylenedicarboxylate, diheptyl acetylenedicarboxylate, dioctyl acetylenedicarboxylate and the like. Examples of the above-mentioned halogenated cyclic carbonate compound may include chloroethylene carbonate, dichloroethylene carbonate, fluoroethylene carbonate, difluoroethylene carbonate and the like. Examples of the above-mentioned cyclic sulfite ester may include ethylene sulfite and the like, and examples of the above-mentioned cyclic sulfuric acid ester may include propanesultone, butanesultone and the like. Among these additives, vinylene carbonate, vinylethylene carbonate, dipropargyl carbonate, dimethyl acetylenedicarboxylate, diethyl acetylenedicarboxylate, chloroethylene carbonate, dichloroethylene carbonate, fluoroethylene carbonate, ethylene sulfite, propanesultone and butanesultone are preferable, and vinylene carbonate, dipropargyl carbonate, dimethyl acetylenedicarboxylate, chloroethylene carbonate, fluoroethylene carbonate, ethylene sulfite and propanesultone are more preferable, vinylene carbonate, dipropargyl carbonate, chloroethylene carbonate, fluoroethylene carbonate, ethylene sulfite and propanesultone are even more preferable.

One of these additives may be used alone, or two or more kinds may be used in combination. In the non-aqueous electrolyte according to the present invention, in the case when the content of these additives is too small, a sufficient effect cannot be exerted, whereas in the case when the content is too much, an amount-increasing effect that reflects the content cannot be obtained, and the properties of the non-aqueous electrolyte may be rather adversely affected; therefore, the content of these additives is preferably 0.005 to 10 mass %, more preferably 0.02 to 5 mass %, and even more preferably 0.05 to 3 mass % in the non-aqueous electrolyte.

As the organic solvent used in the non-aqueous electrolyte according to the present invention, those generally used in non-aqueous electrolytes can be used by one kind or a combination of two or more kinds. Specific examples may include saturated cyclic carbonate compounds, saturated cyclic ester compounds, sulfoxide compounds, sulfone compounds, amide compounds, saturated chain carbonate compounds, chain ether compounds, cyclic ether compounds, saturated chain ester compounds and the like.

Among the above-mentioned organic solvents, the saturated cyclic carbonate compounds, saturated cyclic ester compounds, sulfoxide compounds, sulfone compounds and amide compounds have a high dielectric constant, and thus play a role to increase the dielectric constant of the non-aqueous electrolyte, and the saturated cyclic carbonate compounds are specifically preferable. Examples of the above-mentioned saturated cyclic carbonate compounds may include ethylene carbonate, 1,2-propylene carbonate, 1,3-propylene carbonate, 1,2-butylene carbonate, 1,3-butylene carbonate, 1,1,-dimethylethylene carbonate and the like. Examples of the above-mentioned saturated cyclic ester compounds may include γ-butyrolactone, γ-valerolactone, γ-caprolactone, δ-hexanolactone, δ-octanolactone and the like. Examples of the above-mentioned sulfoxide compounds may include dimethylsulfoxide, diethylsulfoxide, dipropylsulfoxide, diphenylsulfoxide, thiophene and the like. Examples of the above-mentioned sulfone compounds may include dimethylsulfone, diethylsulfone, dipropylsulfone, diphenylsulfone, sulfolane (also referred to as tetramethylenesulfone), 3-methylsulfolane, 3,4-dimethylsulfolane, 3,4-diphenymethylsulfolane, sulfolene, 3-methylsulfolene, 3-ethylsulfolene, 3-bromomethylsulfolene and the like, and sulfolane and tetramethylsulfolane are preferable. Examples of the above-mentioned amide compounds may include N-methylpyrrolidone, dimethylformamide, dimethylacetamide and the like.

Among the above-mentioned organic solvents, the saturated chain carbonate compounds, chain ether compounds, cyclic ether compounds and saturated chain ester compounds can make the battery properties such as output density excellent, for example, they can decrease the viscosity of the non-aqueous electrolyte and can increase the mobility of the electrolyte ions, and the like. Furthermore, since they have a low viscosity, they can increase the performances of the non-aqueous electrolyte at a low temperature, and among these compounds, the saturated chain carbonate compounds are preferable. Examples of such saturated chain carbonate compounds may include dimethyl carbonate (DMC), ethyl methyl carbonate (EMC), diethyl carbonate (DEC), ethyl butyl carbonate, methyl-t-butyl carbonate, diisopropyl carbonate, t-butyl propyl carbonate and the like. Examples of the above-mentioned chain ether compounds or cyclic ether compounds may include dimethoxyethane (DME), ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, diethylene glycol bis(trifluoroethyl) ether and the like, and among these, dioxolane is preferable.

As the above-mentioned saturated chain ester compound, monoester compounds and diester compounds having 2 to 8 carbons in total in a molecule are preferable, and examples of specific compounds may include methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethyl acetate, ethyl trimethyl acetate, methyl malonate, ethyl malonate, methyl succinate, ethyl succinate, methyl 3-methoxypropionate, ethyl 3-methoxypropionate, ethylene glycol diacetyl, propylene glycol diacetyl and the like, and methyl formate, ethyl formate, methyl acetate, ethyl acetate, propyl acetate, isobutyl acetate, butyl acetate, methyl propionate and ethyl propionate are preferable.

As other organic solvents, acetonitrile, propionitrile, nitromethane and derivatives thereof can also be used.

As the electrolyte salt used in the above-mentioned non-aqueous electrolyte according to the present invention, a conventionally-known electrolyte salt is used, and examples may include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, $NaClO_4$, $NaBF_4$, $NaI$, and derivatives thereof, and the like, and among these, it is preferable to use one or more kind selected from the group consisting of $LiPF_6$, $LiBF_4$, $LiClO_4$, $LiAsF_6$, $LiCF_3SO_3$ and $LiC(CF_3SO_2)_3$, and derivatives of $LiCF_3SO_3$, and derivatives of $LiC(CF_3SO_2)_3$, since they are excellent in electrical properties.

It is preferable that the above-mentioned electrolyte salt is dissolved in the above-mentioned organic solvent so that the concentration in the non-aqueous electrolyte according to the present invention becomes 0.1 to 3.0 mol/L, specifically 0.5 to 2.0 mol/L. When the concentration of the electrolyte salt is less than 0.1 mol/L, a sufficient current density may not be obtained, whereas when the concentration is more than 3.0 mol/L, the stability of the non-aqueous electrolyte may be impaired.

Furthermore, a halogen-based, phosphorus-based or other flame retarder can be suitably added to the non-aqueous electrolyte according to the present invention so as to impart flame retardancy. In the case when the addition amount of the flame retarder is too small, a sufficient effect cannot be exerted, whereas in the case when the amount is too much, an amount-increasing effect that reflects the content cannot be obtained, and the properties of the non-aqueous electrolyte for batteries may be rather adversely affected; therefore, the addition amount of the flame retarder is preferably 5 to 100 mass %, and more preferably 10 to 50 mass %, with respect to the organic solvent included in the non-aqueous electrolyte according to the present invention.

Next, the positive electrode used in the present invention will be explained. In the present invention, a negative electrode capable of intercalating and deintercalating lithium ions is used. The negative electrode capable of intercalating and deintercalating lithium ions is not specifically limited as long as it can be used as a negative electrode for general lithium secondary batteries, and examples may include a negative electrode obtained by forming negative electrode materials including a negative electrode active material, a binder and the like into a slurry with a solvent, applying the slurry to a current collector and drying to give a sheet-like form. As the negative electrode active material, crystalline artificial graphite and natural graphite are used, and crystalline graphite in which the crystal surface is coated with other material, crystalline graphite that is in the form of massive particles of microcrystal, MCMB, soft carbon, hard carbon, silicon alloys, tin alloys may be mixed and used. Examples of the binder for the negative electrode active material may include similar binders to those for the positive electrode. The use amount of the above-mentioned binder is preferably 0.001 to 5 parts by mass, more preferably 0.05 to 3 parts by mass, and even more preferably 0.01 to 2 parts by mass, with respect to 100 parts by mass of the above-mentioned negative electrode active material. As the solvent for forming the slurry, an organic solvent or water that dissolves the binder is used. Examples of the organic solvent may include similar organic solvents to those for the positive electrode. The use amount of the above-mentioned solvent is preferably 30 to 300 parts by mass, and more preferably 50 to 200 parts by mass, with respect to 100 parts by mass of the above-mentioned negative electrode active material. Furthermore, as the current collector for the negative electrode, copper, nickel, stainless steel, nickel-plated steel or the like is generally used.

In the non-aqueous electrolyte secondary battery of the present invention, it is preferable to use a separator between the positive electrode and negative electrode, and as the separator, a microporous film of a generally-used polymer can be used without specific limitation. Examples of the film may include films formed of polyethylene, polypropylene, polyvinylidene fluoride, polyvinylidene chloride, polyacrylonitrile, polyacrylamide, polytetrafluoroethylene, polysulfone, polyethersulfone, polycarbonate, polyamide, polyimide, polyethers such as polyethylene oxide and polypropylene oxide, celluloses such as carboxymethyl cellulose and hydroxypropyl cellulose, polymer compounds mainly including poly(meth)acrylic acid and various esters thereof and derivatives thereof, and copolymers and mixtures thereof, and the like. These films may be used alone, or these films may be superposed and used as a multilayer film. Furthermore, various additives may be used in these films, and the kinds and contents thereof are not specifically limited. Among these films, films formed of polyethylene, polypropylene, polyvinylidene fluoride and polysulfone are preferably used in the non-aqueous electrolyte secondary battery of the present invention.

These films have been made microporous so that the electrolyte permeates to allow easy permeation of ions. Examples of methods for making the films microporous may include "a phase separation method" in which a solution of a polymer compound and a solvent is formed into a film while conducting microphase separation, and the solvent is removed by extraction to make pores, "a drawing method" in which a molten polymer compound is extruded at a high draft to form a film and heat-treated, crystals are arranged in one direction, and gaps are further formed between the crystals by drawing, and the like, and the method is suitably selected depending on the film as used.

In the non-aqueous electrolyte secondary battery of the present invention, a phenol-based antioxidant, a phosphorus-based antioxidant, a thioether-based antioxidant, a hindered amine compound and the like may be added to the electrode material, non-aqueous electrolyte and separator, for the purpose of further improvement of safeness.

The shape of the non-aqueous electrolyte secondary battery of the present invention having the above-mentioned constitution is not specifically limited, and may be various shapes such as a coin shape, a cylindrical shape and a square shape. FIG. 1 shows an example of the coin-shaped battery of the non-aqueous electrolyte secondary battery of the present invention, and FIG. 2 and FIG. 3 each show an example of the cylindrical battery.

In the coin-shaped non-aqueous electrolyte secondary battery 10 shown in FIG. 1, 1 is a positive electrode that can release lithium ions, 1a is a positive electrode current collector, 2 is a negative electrode formed of a carboneous material that can store and release lithium ions released from the positive electrode, 2a is negative electrode current collector, 3 is a non-aqueous electrolyte according to the present invention, 4 is a positive electrode case made of stainless steel, 5 is a negative electrode case made of stainless steel, 6 is a gasket made of polypropylene, and 7 is a separator made of polyethylene.

Figure 2:
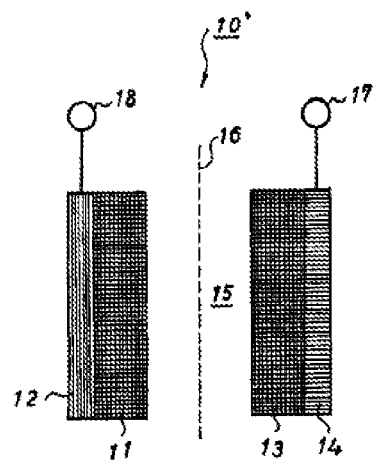
FIG. 2 is a schematic view showing the basic constitution of the cylindrical battery of the non-aqueous electrolyte secondary battery of the present invention.
Figure 3:
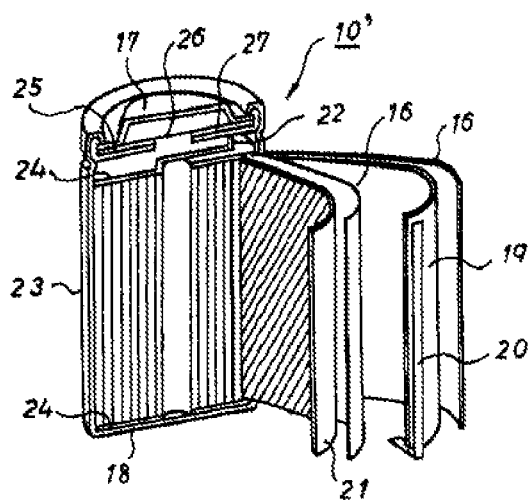
FIG. 3 is a perspective view showing the inner structure of the cylindrical battery of the non-aqueous electrolyte secondary battery of the present invention as a cross-sectional surface.

Furthermore, in the cylindrical non-aqueous electrolyte secondary battery 10' shown in FIG. 2 and FIG. 3, 11 is a negative electrode, 12 is a negative electrode current collector, 13 is a positive electrode, 14 is a positive electrode current collector, 15 is a non-aqueous electrolyte according to the present invention, 16 is a separator, 17 is a positive electrode terminal, 18 is a negative electrode terminal, 19 is a negative electrode plate, 20 is a negative electrode lead, 21 is a positive electrode plate, 22 is a positive electrode lead, 23 is a case, 24 is an insulation plate, 25 is a gasket, 26 is a safety valve, and 27 is a PTC element.

EXAMPLES

Hereinafter the present invention will be explained in more detail by Examples and Comparative Examples. However, the present invention is not construed to be limited by the following Examples and the like. Unless otherwise indicated, the "part(s)" and "%" in Examples are on the mass basis.

Examples 1 to 20 and Comparative Examples 1 to 11

In Examples and Comparative Examples, non-aqueous electrolyte secondary batteries (lithium secondary batteries) were prepared according to the following <Preparation Procedures>

<Preparation Procedures>
[Preparation of Positive Electrode A]
78 parts by mass of LiFePO$_4$ as a positive electrode active material, 18 parts by mass of acetylene black as an electroconductive material, and 4 parts by mass of polyvinylidene fluoride (PVDF) as a binder were mixed to form a positive electrode material. This positive electrode material was dispersed in 140 parts by mass of N-methyl-2-pyrrolidone (NMP) to give a slurry form. This slurry was applied to a positive electrode current collector made of aluminum, dried and press-molded to give a positive electrode plate. Thereafter this positive electrode plate was cut into a predetermined size to thereby make a discoidal positive electrode A.

[Preparation of Positive Electrode B]
90 parts by mass of LiNi$_{0.8}$Co$_{0.17}$Al$_{0.03}$O$_2$ as a positive electrode active material, 5 parts by mass of acetylene black as an electroconductive material, and 5 parts by mass of polyvinylidene fluoride (PVDF) as a binder were mixed to form a positive electrode material. This positive electrode material was dispersed in 140 parts by mass of N-methyl-2-pyrrolidone (NMP) to give a slurry form. This slurry was applied to a positive electrode current collector made of aluminum, dried and press-molded to give a positive electrode plate. Thereafter this positive electrode plate was cut into a predetermined size to thereby make a discoidal positive electrode B.

[Preparation of Negative Electrode]
97.0 parts by mass of natural graphite as a negative electrode active material, 2.0 parts by mass of a styrene-butadiene rubber as a binder, and 1.0 part by mass of carboxymethyl cellulose as a thickening agent were mixed to form a negative electrode material. This negative electrode material was dispersed in 120 parts by mass of water to give a slurry form. This slurry was applied to a negative electrode current collector made of copper, dried and press-molded to give a negative electrode plate. Thereafter this negative electrode plate was cut into a predetermined size to thereby make a discoidal negative electrode.

[Preparation of Electrolyte Solution A]
LiPF$_6$ was dissolved so as to give a concentration of 1 mol/L in a mixed solvent formed of 30 vol % of ethylene carbonate, 40 vol % of ethyl methyl carbonate, 25 vol % of dimethyl carbonate and 5 vol % of propyl acetate to thereby prepare an electrolyte solution A.

[Preparation of electrolyte solution B]
LiPF$_6$ was dissolved so as to give a concentration of 1 mol/L in a mixed solvent formed of 30 vol % of ethylene carbonate, 40 vol % of ethyl methyl carbonate and 30 vol % of dimethyl carbonate to thereby prepare an electrolyte solution B.

[Preparation of Non-Aqueous Electrolyte]
The following compounds A1 to A4, compounds B1 to B3, and compounds C1 to C5, compounds D1 to D2, or comparative compounds A'1 to A'2 were each dissolved in the electrolyte solution A or B as electrolyte additives at a ratio shown in the following [Table 1] or [Table 2] to thereby prepare non-aqueous electrolytes according to the present invention and non-aqueous electrolytes for comparison. The numbers in the brackets in [Table 1] and [Table 2] represent the concentrations (mass %) in the non-aqueous electrolyte.

[Fluorosilane Compounds Represented by General Formula (1)]
Compound A1: 1,2-bis(difluoromethylsilyl)ethane
Compound A2: 1-fluorodimethylsilyl-2-difluoromethylsilylethane
Compound A3: 1-trifluorosilyl-2-difluoromethylsilylethane
Compound A4: 1,7-bis(difluoromethylsilyl)-4-oxaheptane

[Unsaturated Phosphate Ester Compounds Represented by General Formula (2)]

Compound B1: ethyl bis(2-propinyl) phosphate

Compound B2: tris(2-propinyl) phosphate

[Unsaturated Phosphate Ester Compounds Represented by General Formula (3)]

Compound B3: 2,4-hexadiyne-1,6-diol tetraethyl diphosphate

[Fluorosilane Compound Represented by General Formula (4)]

Compound C1: n-butylfluorodimethylsilane

Compound C2: 1,2-bis(fluorodimethylsilyl)ethane

Compound C3: 3-methoxypropyldimethylfluorosilane

Compound C4: methyl (2-dimethylfluorosilyl)propionate

Compound C5: (3-dimethylfluorosilyl)propyl acetate

[Cyclic Carbonate Compound Having Unsaturated Group]

Compound D1: vinylene carbonate

[Cyclic Sulfate Ester Compound]

Compound D2: propanesultone

[Comparative Fluorosilane Compound A'1]

Difluorodiphenylsilane

[Comparative Fluorosilane Compound A'2]

Di-n-butyldifluorosilane

[Assembly of Battery]

A microporous film made of polyethylene having a thickness of 25 μm was interposed between the obtained discoidal positive electrode A or B and the discoidal negative electrode and retained in a case. Thereafter each non-aqueous electrolyte was injected into the case so that the combination of the non-aqueous electrolyte according to the present invention or the non-aqueous electrolyte for comparison and the positive electrode became [Table 1] or [Table 2], and the case was tightly closed and sealed to make a coin-shaped lithium secondary battery having a diameter of 20 mm and a thickness of 3.2 mm; by this way, the non-aqueous electrolyte secondary batteries of Examples 1 to 20 and Comparative Examples 1 to 11 were obtained.

TABLE 1

| | Electrolyte additive | | | Electrolyte solution | Positive electrode |
|---|---|---|---|---|---|
| Example 1 | A1 (0.5) | — | — | A | A |
| Example 2 | A2 (0.5) | — | — | A | A |
| Example 3 | A3 (0.5) | — | — | A | A |
| Example 4 | A4 (0.5) | — | — | A | A |
| Example 5 | A1 (0.5) | B1 (0.5) | — | A | A |
| Example 6 | A1 (0.5) | B2 (0.5) | — | A | A |
| Example 7 | A1 (0.5) | B3 (0.5) | — | A | A |
| Example 8 | A1 (0.3) | — | C1 (0.2) | A | A |
| Example 9 | A1 (0.3) | — | C2 (0.2) | A | A |
| Example 10 | A1 (0.3) | — | C3 (0.2) | A | A |
| Example 11 | A1 (0.3) | — | C4 (0.2) | A | A |
| Example 12 | A1 (0.3) | — | C5 (0.2) | A | A |
| Example 13 | A1 (0.5) | — | — | D1 (1.0) | A | A |
| Example 14 | A1 (0.5) | — | — | D2 (2.0) | A | A |
| Example 15 | A1 (0.3) | B2 (0.3) | C3 (0.2) | — | A | A |
| Example 16 | A1 (0.5) | B2 (0.5) | — | — | B | A |
| Example 17 | A1 (0.3) | B2 (0.3) | C2 (0.2) | — | B | A |
| Example 18 | A1 (0.3) | B2 (0.3) | C3 (0.2) | — | B | A |
| Example 19 | A1 (0.5) | — | — | D1 (0.5) | A | B |
| Example 20 | A1 (0.3) | B2 (0.3) | C3 (0.2) | — | A | B |

TABLE 2

| | Electrolyte additive | | Electrolyte solution | Positive electrode |
|---|---|---|---|---|
| Comparative Example 1 | — | — | A | A |
| Comparative Example 2 | A'1 (0.5) | — | A | A |
| Comparative Example 3 | A'2 (0.5) | — | A | A |
| Comparative Example 4 | A'2 (0.5) | B1 (0.5) | A | A |
| Comparative Example 5 | A'2 (0.5) | B2 (2.0) | A | A |
| Comparative Example 6 | A'2 (0.5) | — | A | B |
| Comparative Example 7 | — | C1 (0.5) | A | A |
| Comparative Example 8 | — | C2 (0.5) | A | A |
| Comparative Example 9 | — | C3 (0.5) | A | A |
| Comparative Example 10 | — | C4 (0.5) | A | A |
| Comparative Example 11 | — | C5 (0.5) | A | A |

Using the lithium secondary batteries of Examples 1 to 20 and Comparative Examples 1 to 11, initial property tests and cycle property tests were conducted by the following test methods. In the initial property tests, discharge capacity ratios and internal resistance ratios were obtained. Furthermore, in the cycle property tests, discharge capacity maintenance rates and internal resistance increase rates were obtained. These test results are shown in the following [Table 3] and [Table 4]. A non-aqueous electrolyte secondary battery having a finer initial property has a higher discharge capacity ratio and a lower value of an internal resistance ratio. Furthermore, a non-aqueous electrolyte secondary battery having a finer cycle property has a higher discharge capacity maintenance rate and a lower internal increase rate.

<Method for Initial Property Test in Case of Positive Electrode A> a. Method for Measuring Discharge Capacity Ratio

The lithium secondary battery was put into a thermostatic bath at 20° C., and operations in which charging is conducted at a constant current and a constant voltage up to 4.0V at a charge current of 0.3 mA/cm$^2$ (a current value corresponding to 0.2 C) and discharging is conducted at a constant current up to 3.0 V at a discharge current of 0.3 mA/cm$^2$ (a current value corresponding to 0.2 C) were repeated five times. Thereafter charging was conducted at a constant current and a constant voltage up to 4.0 V at a charge current of 0.3 mA/cm$^2$, and discharging was conducted at a constant current up to 3.0 V at a discharge current of 0.3 mA/cm$^2$. This discharge capacity that was measured at the sixth time was defined as the initial discharge capacity of the battery, and as shown in the following formula, a discharge capacity ratio (%) was obtained as the rate of the initial discharge capacity in the case when the initial discharge capacity of Example 1 is 100.

Discharge capacity ratio (%)=[(Initial discharge capacity)/(Initial discharge capacity in Example 1)]×100 b. Method for Measuring Internal Resistance Ratio

The above-mentioned lithium secondary battery after the measurement of the sixth discharge capacity was first charged at a constant current so that SOC became 60% at a charge current of 1.5 mA/cm$^2$ (a current value corresponding to 1 C), and scanned by using an alternate current impedance measurement device (manufactured by IVIUM TECHNOLO- GIES, trade name: a mobile type potentiostat CompactStat) up to a frequency of 100 kHz to 0.02 Hz to thereby prepare a Cole-Cole Plot in which the longitudinal axis indicates an imaginary part and the lateral axis indicates a real part. Next, in this Cole-Cole Plot, the circular arc part was fit to a circle, and the larger value of the two points intersecting with the real part of this circle was defined as the initial internal resistance of the battery, and as shown in the following formula, an internal resistance ratio (%) was obtained as a ratio of the initial internal resistance in the case when the initial internal resistance in Example 1 is 100.

Internal resistance ratio (%)=[(initial internal resistance)/(initial internal resistance in Example 1)]×100

<Method for Initial Property Test in Case of Positive Electrode B>

The lithium secondary battery was put into a thermostatic bath at 20° C., and operations in which charging is conducted at a constant current and a constant voltage up to 4.2 V at a charge current of 0.3 mA/cm² (a current value corresponding to 0.2 C) and discharging is conducted at a constant current up to 3.0 V at a discharge current of 0.3 mA/cm² (a current value corresponding to 0.2 C) were repeated five times. Thereafter charging was conducted at a constant current and a constant voltage up to 4.2 V at a charge current of 0.3 mA/cm², and discharging was conducted at a constant current up to 3.0 V at a discharge current of 0.3 mA/cm². This discharge capacity that was measured at the sixth time was defined as the initial discharge capacity of the battery, and a discharge capacity ratio (%) was obtained in a similar manner to the case of the positive electrode A. Furthermore, for the lithium secondary battery after the measurement of the sixth discharge capacity, an internal resistance ratio (%) was obtained in a similar manner to the case of the positive electrode A.

<Method for Cycle Property Test in Case of Positive Electrode A> a. Method for Measuring Discharge Capacity Maintenance Rate

The lithium secondary battery after the initial property test was put into a thermostatic bath at 60° C., and cycles wherein charging is conducted at a constant current up to 4.0V at a charge current of 1.5 mA/cm² (a current value corresponding to 1 C, wherein 1 C is a current value at which a battery capacity is discharged in 1 hour) and discharging is conducted at a constant current up to 3.0 V at a discharge current of 1.5 mA/cm² in each cycle were repeatedly conducted 250 times. This 250$^{th}$ discharge capacity was defined as a discharge capacity after the cycle test, and as shown in the following formula, a discharge capacity maintenance rate (%) was obtained as a ratio of the discharge capacity after the cycle test in the case when the initial discharge capacity is 100.

Discharge capacity maintenance rate (%)=[(discharge capacity after cycle test)/(initial discharge capacity)]×100 b. Method for Measuring Internal Resistance Increase Rate

After the cycle test, the atmosphere temperature was returned to 20° C., and an internal resistance at 20° C. was measured in a similar manner to the method for measuring the above-mentioned internal resistance ratio, and the internal resistance at this time was defined as an internal resistance after the cycle test, and as shown in the following formula, an internal resistance increase rate (%) was obtained as a ratio of increase in the internal resistance after the cycle test in the case when the initial internal resistance of each battery is 100.

Internal resistance increase rate (%)=[(internal resistance after cycle test−initial internal resistance)/(initial internal resistance)]×100

<Method for Cycle Property Test in Case of Positive Electrode B>

The lithium secondary battery after the initial property test was put into a thermostatic bath at 60° C., and cycles wherein charging is conducted at a constant current up to 4.2 V at a charge current of 1.5 mA/cm² (a current value corresponding to 1 C, wherein 1 C is a current value at which a battery capacity is discharged in 1 hour) and discharging is conducted at a constant current up to 3.0 V at a discharge current of 1.5 mA/cm² in each cycle were repeatedly conducted 250 times. This 250$^{th}$ discharge capacity was defined as a discharge capacity after the cycle test, and a discharge capacity maintenance rate (%) was obtained in a similar manner to the case of the positive electrode A. Furthermore, for the lithium secondary battery after the cycle test, an internal resistance increase rate (%) was obtained in a similar manner to the case of the positive electrode A.

TABLE 3

|  | Initial properties | | Cycle property test | |
|  | Discharge capacity ratio (%) | Internal resistance ratio (%) | Discharge capacity maintenance rate (%) | Internal resistance increase rate (%) |
| --- | --- | --- | --- | --- |
| Example 1 | 100 | 100 | 80 | 37 |
| Example 2 | 100 | 100 | 81 | 36 |
| Example 3 | 99 | 99 | 79 | 36 |
| Example 4 | 101 | 105 | 82 | 39 |
| Example 5 | 100 | 102 | 84 | 38 |
| Example 6 | 99 | 103 | 83 | 39 |
| Example 7 | 100 | 101 | 82 | 37 |
| Example 8 | 101 | 95 | 81 | 31 |
| Example 9 | 100 | 96 | 83 | 28 |
| Example 10 | 99 | 99 | 80 | 32 |
| Example 11 | 99 | 100 | 82 | 35 |
| Example 12 | 101 | 97 | 83 | 34 |
| Example 13 | 100 | 99 | 82 | 38 |
| Example 14 | 101 | 105 | 83 | 41 |
| Example 15 | 101 | 99 | 85 | 29 |
| Example 16 | 100 | 103 | 81 | 39 |
| Example 17 | 100 | 101 | 82 | 39 |
| Example 18 | 100 | 99 | 83 | 38 |
| Example 19 | 100 | 70 | 79 | 32 |
| Example 20 | 100 | 71 | 82 | 34 |

TABLE 4

|  | Initial properties | | Cycle property test | |
|  | Discharge capacity ratio (%) | Internal resistance ratio (%) | Discharge capacity maintenance rate (%) | Internal resistance increase rate (%) |
| --- | --- | --- | --- | --- |
| Comparative Example 1 | 99 | 115 | 42 | 177 |
| Comparative Example 2 | 98 | 140 | 28 | 218 |
| Comparative Example 3 | 99 | 116 | 45 | 163 |
| Comparative Example 4 | 99 | 118 | 63 | 88 |
| Comparative Example 5 | 100 | 113 | 61 | 101 |
| Comparative Example 6 | 100 | 113 | 68 | 71 |
| Comparative Example 7 | 100 | 98 | 70 | 45 |
| Comparative Example 8 | 100 | 99 | 73 | 43 |

TABLE 4-continued

| | Initial properties | | Cycle property test | |
|---|---|---|---|---|
| | Discharge capacity ratio (%) | Internal resistance ratio (%) | Discharge capacity maintenance rate (%) | Internal resistance increase rate (%) |
| Comparative Example 9 | 100 | 97 | 68 | 40 |
| Comparative Example 10 | 99 | 115 | 75 | 55 |
| Comparative Example 11 | 98 | 120 | 62 | 65 |

The following matters are evident from the results of [Table 3] and [Table 4].

It could be confirmed that the non-aqueous electrolyte secondary batteries of the present invention, which use a non-aqueous electrolyte containing a fluorosilane compound represented by the above-mentioned general formula (1) in non-aqueous electrolyte secondary batteries using a polyanion compound or a lithium nickelate as a positive electrode active material, are not only excellent in both the discharging capacity and internal resistance at the initial stage of the battery but also excellent in both the discharging capacity and internal resistance after the cycle test at 60° C., as compared to the non-aqueous electrolyte secondary batteries of Comparative Examples which use a non-aqueous electrolyte containing a comparative fluorosilane compound, and thus can maintain excellent battery properties.

For the lithium secondary batteries of Examples 1 to 18 and Comparative Examples 1 to 11, the degree of elution of manganese from the positive electrode was confirmed by examining the amount of the manganese adhered to the negative electrode by the following method. The results are shown in [Table 5] and [Table 6].

<Amount of Iron Adhered to Negative Electrode>

The lithium secondary battery after the cycle test was disassembled, and the amount of iron adhered to the negative electrode was examined by using an EDX-SEM. The negative electrode was removed by disassembling the lithium secondary battery, washed with dimethyl carbonate, dried, and subjected to an EDX-SEM analysis. The amount of the adhered iron was evaluated by the five grades from + to +++++, and a larger number of + represents that more iron was eluted from the positive electrode.

TABLE 5

| | Amount of adhered iron |
|---|---|
| Example 1 | ++ |
| Example 2 | ++ |
| Example 3 | ++ |
| Example 4 | ++ |
| Example 5 | ++ |
| Example 6 | ++ |
| Example 7 | ++ |
| Example 8 | + |
| Example 9 | + |
| Example 10 | + |
| Example 11 | + |
| Example 12 | ++ |
| Example 13 | ++ |

TABLE 5-continued

| | Amount of adhered iron |
|---|---|
| Example 14 | ++ |
| Example 15 | + |
| Example 16 | ++ |
| Example 17 | + |
| Example 18 | + |

TABLE 6

| | Amount of adhered iron |
|---|---|
| Comparative Example 1 | +++++ |
| Comparative Example 2 | +++++ |
| Comparative Example 3 | +++++ |
| Comparative Example 4 | +++++ |
| Comparative Example 5 | +++++ |
| Comparative Example 7 | ++++ |
| Comparative Example 8 | ++++ |
| Comparative Example 9 | +++++ |
| Comparative Example 10 | ++++ |
| Comparative Example 11 | +++++ |

As is evident from the results in [Table 5] and [Table 6], it was confirmed that the elution of iron from the positive electrode active material can be suppressed by using a non-aqueous electrolyte containing a fluorosilane compound represented by the above-mentioned general formula (1) in a non-aqueous electrolyte secondary battery using a polyanion compound as a positive electrode active material.

As mentioned above, the non-aqueous electrolyte secondary battery of the present invention can maintain a small internal resistance and a high electric capacity even after undergoing storage at a high temperature or charging and discharging at a high temperature, by using a non-aqueous electrolyte containing a fluorosilane compound represented by the above-mentioned general formula (1), to thereby suppress the elution of iron from a polyanion compound specifically at a high temperature when the polyanion compound is used as a positive electrode active material, or to thereby alleviate the deterioration of a binder by a residual alkali component when a lithium nickelate is used as a positive electrode active material.

Industrial Applicability

The non-aqueous electrolyte secondary battery of the present invention can be used in various applications such as video cameras, digital cameras, portable music players, sound recorders, portable DVD players, portable game consoles, notebook-size personal computers, electronic dictionaries, electronic diaries, electronic books, mobile phones, portable televisions, power-assisted bicycles, battery automobiles and hybrid automobiles, and among these, the non-aqueous electrolyte secondary battery can be preferably used in battery automobiles and hybrid automobiles which are sometimes used in high temperature states.

Reference Signs List
1: Positive electrode
1a: Positive electrode current collector
2: Negative electrode
2a: Negative electrode current collector
3: Non-aqueous electrolyte
4: Positive electrode case
5: Negative electrode case
6: Gasket
7: Separator
10: Coin-shaped non-aqueous electrolyte secondary battery
10': Cylindrical non-aqueous electrolyte secondary battery
11: Negative electrode
12: Negative electrode current collector
13: Positive electrode
14: Positive electrode current collector
15: Non-aqueous electrolyte
16: Separator
17: Positive electrode terminal
18: Negative electrode terminal
19: Negative electrode plate
20: Negative electrode lead
21: Positive electrode plate
22: Positive electrode lead
23: Case
24: Insulation plate
25: Gasket
26: Safety valve
27: PTC element

The invention claimed is:

1. A non-aqueous electrolyte secondary battery having a negative electrode that is capable of intercalating and deintercalating lithium ions, a positive electrode containing a lithium-containing compound as a positive electrode active material, and a non-aqueous electrolyte in which a lithium salt is dissolved in an organic solvent, wherein the lithium-containing compound is a polyanion compound or a lithium nickelate, and the non-aqueous electrolyte contains a fluorosilane compound represented by the following general formula (1):

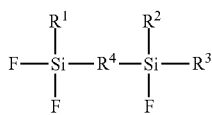
(1)

wherein $R^1$ to $R^3$ each independently represent an alkyl group having 1 to 8 carbon(s) or a fluorine atom, and $R^4$ represents an alkylene group having 1 to 8 carbon(s) or an alkylene group having 4 to 8 carbons having an ether group.

2. The non-aqueous electrolyte secondary battery according to claim 1, wherein the non-aqueous electrolyte further contains an unsaturated phosphate ester compound represented by the following general formula (2) or an unsaturated phosphate ester compound represented by the following general formula (3):

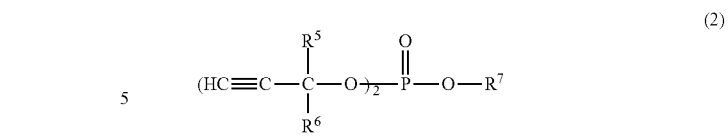
(2)

wherein $R^5$ and $R^6$ each independently represent a hydrogen atom or an alkyl group having 1 to 8 carbon(s), and $R^7$ represents an alkyl group having 1 to 8 carbon(s), an alkenyl group having 2 to 8 carbons, an alkynyl group having 2 to 8 carbons or a halogenated alkyl group having 1 to 8 carbon(s):

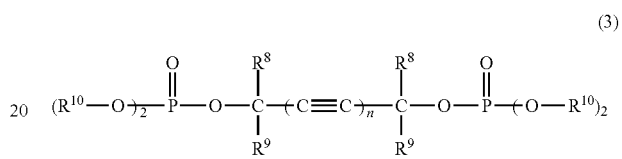
(3)

wherein $R^8$ and $R^9$ each independently represent a hydrogen atom or an alkyl group having 1 to 8 carbon(s), $R^{10}$ represents an alkyl group having 1 to 8 carbon(s), an alkenyl group having 2 to 8 carbons, an alkynyl group having 2 to 8 carbons or a halogenated alkyl group having 1 to 8 carbon(s), and n represents 1 or 2.

3. The non-aqueous electrolyte secondary battery according to claim 1, wherein the non-aqueous electrolyte further contains a fluorosilane compound represented by the following general formula (4):

(4)

wherein $R^{11}$ and $R^{12}$ each independently represent an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, $X^1$ represents a fluorine atom, an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons, an aralkyl group having 7 to 18 carbons, a group represented by the following general formula (5) or a group represented by the following general formula (6):

(5)

wherein $R^{11}$ and $R^{12}$ are as defined in the general formula (4), and $R^{13}$ represents an alkylene group having 1 to 8 carbon(s), an alkenylene group having 2 to 8 carbons, an alkynylene group having 2 to 8 carbons or an arylene group having 6 to 18 carbons;

  (6)

wherein $R^{14}$ represents an alkylene group having 1 to 8 carbon(s), an alkenylene group having 2 to 8 carbons, an alkynylene group having 2 to 8 carbons or an arylene group having 6 to 18 carbons, $R^{15}$ represents an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, and $X^2$ represents an oxygen atom, a —C(=O)—O— group or an —O—C(=O)— group.

4. A non-aqueous electrolyte, which is used in the non-aqueous electrolyte secondary battery according to claim 1.

5. The non-aqueous electrolyte secondary battery according to claim 2, wherein the non-aqueous electrolyte further contains a fluorosilane compound represented by the following general formula (4):

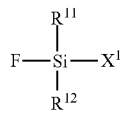  (4)

wherein $R^{11}$ and $R^{12}$ each independently represent an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, $X^1$ represents a fluorine atom, an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons, an aralkyl group having 7 to 18 carbons, a group represented by the following general formula (5) or a group represented by the following general formula (6):

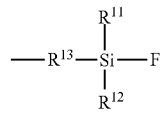  (5)

wherein $R^{11}$ and $R^{12}$ are as defined in the general formula (4), and $R^{13}$ represents an alkylene group having 1 to 8 carbon(s), an alkenylene group having 2 to 8 carbons, an alkynylene group having 2 to 8 carbons or an arylene group having 6 to 18 carbons;

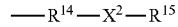  (6)

wherein $R^{14}$ represents an alkylene group having 1 to 8 carbon(s), an alkenylene group having 2 to 8 carbons, an alkynylene group having 2 to 8 carbons or an arylene group having 6 to 18 carbons, $R^{15}$ represents an alkyl group having 1 to 8 carbon(s), an alkenyl group having 2 to 8 carbons, an alkynyl group having 2 to 8 carbons, a halogenated alkyl group having 1 to 8 carbon(s), an aryl group having 6 to 18 carbons, a halogenated aryl group having 6 to 18 carbons or an aralkyl group having 7 to 18 carbons, and $X^2$ represents an oxygen atom, a —C(=O)—O— group or an —O—C(=O)— group.

6. A non-aqueous electrolyte, which is used in the non-aqueous electrolyte secondary battery according to claim 2.

7. A non-aqueous electrolyte, which is used in the non-aqueous electrolyte secondary battery according to claim 3.

8. A non-aqueous electrolyte, which is used in the non-aqueous electrolyte secondary battery according to claim 5.

* * * * *